United States Patent
Longman et al.

(10) Patent No.: US 10,921,424 B2
(45) Date of Patent: Feb. 16, 2021

(54) ON-VEHICLE RADAR SYSTEM

(71) Applicant: GM Global Technology Operations LLC, Detroit, MI (US)

(72) Inventors: Oren Longman, Tel Aviv (IL); Shahar Villeval, Tel Aviv (IL); Igal Bilik, Rehovot (IL)

(73) Assignee: GM Global Technology Operations LLC, Detroit, MI (US)

( * ) Notice: Subject to any disclaimer, the term of this patent is extended or adjusted under 35 U.S.C. 154(b) by 516 days.

(21) Appl. No.: 15/796,912

(22) Filed: Oct. 30, 2017

(65) Prior Publication Data

US 2019/0129003 A1    May 2, 2019

(51) Int. Cl.
| | |
|---|---|
| *G01S 7/35* | (2006.01) |
| *G01S 13/34* | (2006.01) |
| *G01S 7/02* | (2006.01) |
| *G01S 13/42* | (2006.01) |
| *G01S 13/87* | (2006.01) |
| *G01S 13/32* | (2006.01) |
| *G01S 13/89* | (2006.01) |
| *G01S 13/931* | (2020.01) |

(52) U.S. Cl.
CPC ............. *G01S 7/35* (2013.01); *G01S 7/023* (2013.01); *G01S 13/32* (2013.01); *G01S 13/343* (2013.01); *G01S 13/42* (2013.01); *G01S 13/87* (2013.01); *G01S 13/89* (2013.01); *G01S 13/931* (2013.01); *G01S 2013/9316* (2020.01)

(58) Field of Classification Search
None
See application file for complete search history.

(56) References Cited

U.S. PATENT DOCUMENTS

| | | | |
|---|---|---|---|
| 5,469,479 A * | 11/1995 | Chang | G01S 7/282 342/201 |
| 2012/0146844 A1* | 6/2012 | Stirling-Gallacher | G01S 13/343 342/189 |
| 2019/0056478 A1* | 2/2019 | Millar | G01S 13/343 |

* cited by examiner

*Primary Examiner* — Whitney Moore
(74) *Attorney, Agent, or Firm* — Quinn IP Law

(57) ABSTRACT

A radar system for a ground vehicle includes a MIMO system including a plurality of transmitters, a plurality of receivers, and a controller including an interpreter in communication with the plurality of transmitters and the plurality of receivers. The transmitters include a first transmitter and a plurality of second transmitters, and each of the transmitters includes a signal generator in communication with a transmitting antenna that is disposed to transmit a radar signal. Each of the radar signals is a linear-frequency-modulated continuous-wave (LFM-CW) radar signal including a chirp-start portion, and each of the receivers includes a receiving antenna that is disposed to receive reflected radar signals. The transmitters are controllable such that the chirp-start portions of the LFM-CW radar signals from the second transmitters have progressively increasing time delays as compared to the chirp-start portion of the LFM-CW radar signal from the first transmitter.

18 Claims, 2 Drawing Sheets

ON-VEHICLE RADAR SYSTEM

INTRODUCTION

On-vehicle radar systems may be employed to detect and locate other vehicles, pedestrians and fixed or moving objects when deployed on ground vehicles.

SUMMARY

A radar system for a ground vehicle is described, and includes a MIMO (multiple input-multiple output) system including a plurality of transmitters, a plurality of receivers, and a controller including an interpreter in communication with the plurality of transmitters and the plurality of receivers. The plurality of transmitters includes a first transmitter and a plurality of second transmitters, and each of the transmitters includes a signal generator in communication with a transmitting antenna that is disposed to transmit a radar signal. Each of the radar signals is a linear-frequency-modulated continuous-wave (LFM-CW) radar signal including a chirp-start portion, and each of the receivers includes a receiving antenna that is disposed to receive reflected radar signals. The transmitters are controllable such that the chirp-start portions of the LFM-CW radar signals that are transmitted from the second transmitters have progressively increasing time delays as compared to the chirp-start portion of the LFM-CW radar signal that is transmitted from the first transmitter.

An aspect of the disclosure includes the plurality of transmitting antennae being disposed in a common location on the vehicle.

Another aspect of the disclosure includes the plurality of receiving antennae being disposed in a common location on the vehicle.

Another aspect of the disclosure includes each of the signal generators of the plurality of transmitters being configured to generate the respective LFM-CW radar signals independently from the other of the signal generators of the transmitters.

Another aspect of the disclosure includes the transmitting antennae being in close proximity to the receiving antennae on the vehicle.

Another aspect of the disclosure includes the signal generators being chirp digital direct synthesizer devices.

Another aspect of the disclosure includes the plurality of transmitters being controllable such that the respective chirp-start portions of the LFM-CW radar signals that are transmitted from the second transmitters have progressively increased frequencies as compared to the frequency of the LFM-CW radar signal that is transmitted from the first transmitter.

Another aspect of the disclosure includes the progressively increased time delays being selected to render the LFM-CW radar signals transmitted from each of the second transmitters orthogonal to the LFM-CW radar signal that is transmitted from the first transmitter.

Another aspect of the disclosure includes each of the receivers including a receiving antenna that is disposed to receive a reflected radar signal, and wherein each of the receivers includes a matched-filter that is disposed to identify intended received signals from the reflected radar signal.

Another aspect of the disclosure includes the interpreter being disposed to effect image formation and analysis based upon the reflected radar signal.

Another aspect of the disclosure includes a method for operating a MIMO radar system that is disposed on-vehicle.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
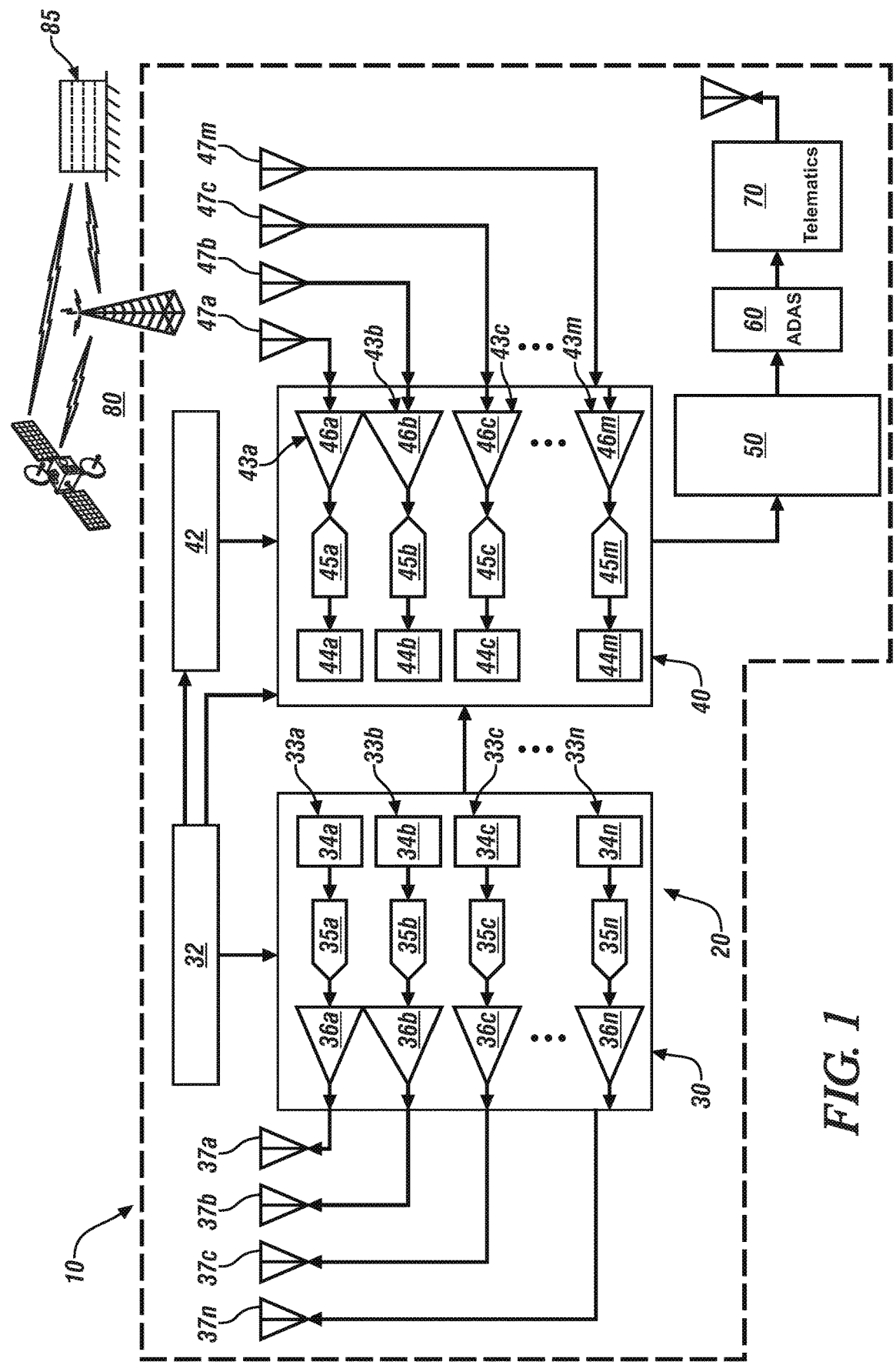
FIG. 1 schematically illustrates an on-vehicle radar system that may be disposed on a vehicle, in accordance with the disclosure.

Referring to the drawings, wherein like reference numerals correspond to like or similar components, FIG. 1, consistent with embodiments disclosed herein, schematically illustrates an on-vehicle radar system 20 that may be disposed on a vehicle 10. The vehicle 10 may include, but not be limited to a ground vehicle in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. The vehicle 10 may include an advanced driving assistance system (ADAS) 60 that provides a level of autonomous vehicle control and a telematics system 70. The on-vehicle radar system 20 provides information related to location and trajectory of vehicles, pedestrians and other objects proximal to the vehicle 10, with such information being communicated to the ADAS 60 for its use, which may include informing the driver and autonomously controlling the vehicle 10.

As employed herein, the ADAS 60 includes an on-vehicle control system that is capable of providing a level of driving automation. The terms 'driver' and 'operator' describe the person responsible for directing operation of the vehicle 10, whether actively involved in controlling one or more vehicle functions or directing autonomous vehicle operation. Driving automation can include various dynamic driving and vehicle operations. Driving automation can include some level of automatic control or intervention related to a single vehicle function, such as steering, acceleration, and/or braking, with the driver continuously having overall control of the vehicle 10. Driving automation can include some level of automatic control or intervention related to simultaneous control of multiple vehicle functions, such as steering, acceleration, and/or braking, with the driver continuously having overall control of the vehicle. Driving automation can include simultaneous automatic control of all vehicle driving functions, including steering, acceleration, and braking, wherein the driver cedes control of the vehicle 10 for a period of time during a trip. Driving automation can include simultaneous automatic control of vehicle driving functions, including steering, acceleration, and braking, wherein the driver cedes control of the vehicle for an entire trip. Driving automation includes hardware and controllers configured to monitor the spatial environment under various driving modes to perform various driving tasks during dynamic operation. Driving automation can include, by way of non-limiting examples, cruise control, adaptive cruise control, lane-change warning, intervention and control, automatic parking, acceleration, braking, and the like. The ADAS 60 preferably includes one or a plurality of vehicle systems and associated controllers that provide a level of driving automation. The vehicle systems, subsystems and controllers associated with the ADAS 60 are implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc.

The on-vehicle radar system 20 may be configured as a multiple input/multiple output (MIMO) system that includes a transmitting portion 30, a receiving portion 40 and a signal constructor controller 50. The elements of the on-vehicle radar system 20 are configured to operate as a linear-frequency-modulated continuous-wave (LFM-CW) system. The transmit frequency and related operating parameters for the LFM-CW system are selected to achieve desired values for range, range resolution, angular resolution and velocity resolution for the expected operating environment of the vehicle 10.

The transmitting portion 30 of the radar system 20 includes a quantity of n transmitters 33, which are designated by numerals 33a, 33b, 33c, . . . 33n. Each of the transmitters 33a, 33b, 33c, . . . 33n includes a respective signal generator 34a, 34b, 34c, . . . 34n that is in communication with a respective digital-to-analog converter (modulator) 35a, 35b, 35c, . . . 35n that is in communication with a respective power amplifier 36a, 36b, 36c, . . . 36n, which supplies a power signal to a respective antenna 37a, 37b, 37c, . . . 37n. The operation of the transmitters 33a, 33b, 33c, . . . 33n is controlled by a transmitter controller 32. In one embodiment, the signal generators 34a, 34b, 34c, . . . 34n are chirp digital direct synthesizer devices. The n transmitters 33 are disposed in a common location on the vehicle 10 in one embodiment.

The receiving portion 40 includes a quantity of m receivers 43, which are designated by numerals 43a, 43b, 43c, . . . 43m. Each of the receivers 43a, 43b, 43c, . . . 43m includes a respective antenna 47a, 47b, 47c, . . . 47m that is in communication with a respective power amplifier 46a, 46b, 46c, . . . 46m that is in communication with a respective digital-to-analog converter 45a, 45b, 45c, . . . 45m, which is in communication with a respective signal generator 44a, 44b, 44c, . . . 44m. The operation of the receivers 43a, 43b, 43c, . . . 43m is controlled by a receiver controller 42. The m receivers 43 are disposed in a common location on the vehicle 10 in one embodiment. The m receivers 43 and the n transmitters are disposed in a common location on the vehicle 10 in one embodiment.

The transmitter controller 32 communicates with each of the transmitters 33a, 33b, 33c, . . . 33n, the receiver controller 42, and in one embodiment, the receivers 43a, 43b, 43c, . . . 43m. The receiver controller 42 communicates with the receivers 43a, 43b, 43c, . . . 43m. The receivers 43a, 43b, 43c, . . . 43m communicate with the signal constructor controller 50.

The quantity of n transmitters 33 may be equal to the quantity of m receivers 43 in one embodiment. Alternatively, the quantity of n transmitters 33 may be less than the quantity of m receivers 43, or the quantity of n transmitters 33 may be greater than the quantity of m receivers 43.

The transmitter controller 32 commands timing and control of the transmitters 33a, 33b, 33c, . . . 33n to effect LFM-CW radar signal generation and transmission. The receiver controller 42 interacts with the receivers 43a, 43b, 43c, . . . 43m to receive and record a reflected radar signal, i.e., an echo signal. The receiver controller 42 includes a matched-filter that is disposed to identify intended received signals from the reflected radar signal to effect decoding. The signal constructor controller 50 effects image formation and analysis based upon the radar signal reception and recorded data. The matched-filter is employed to permit the received signals to be individually discernible over the series of generated LFM-CW radar signals.

The telematics controller 70 includes a wireless telematics communication system capable of extra-vehicle communications, including communicating with a communication network 80 having wireless and wired communication capabilities. The telematics controller 70 is capable of extra-vehicle communications that includes short-range vehicle-to-vehicle (V2V) communication. Alternatively or in addition, the telematics controller 70 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics controller, and the handheld device executes the extra-vehicle communication, including communicating with an off-board controller 85 via the communication network 80. Alternatively or in addition, the telematics controller executes the extra-vehicle communication directly by communicating with the off-board controller 85 via the communication network 80.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The transmitters 33a, 33b, 33c, . . . 33n are disposed to transmit a corresponding plurality of radar signals, including employing the LFM-CW radar operation. Each of the transmitters 33a, 33b, 33c, . . . 33n transmits a radar signal that includes a chirp start, an example of which is graphically illustrated with reference to FIG. 2. One characteristic of LFM-CW radar is that frequency and time are equivalent. Thus, as detailed herein, time delays in the chirp starts of transmitters 33b, 33c, . . . 33n in relation to the chirp start of transmitter 33a may be advantageously incorporated to effect frequency shifts between the transmitters 33a, 33b, 33c, . . . 33n.

In operation, the transmitters 33b, 33c, . . . 33n are shifted in frequency relative to transmitter 33a by incorporating time delays in the respective chirp starts. This includes controlling the plurality of the transmitters 33a, 33b, 33c, . . . 33n to effect progressively increasing time delays in successive chirp-start portions of the transmitted LFM-CW radar signals from successive second ones of the transmitters, e.g., transmitters 33b, 33c, . . . 33n, as compared to the chirp-start portion for the first transmitter, e.g., transmitter 33a.

The transmitted radar signal can be mathematically represented by the following relationship:

$$S(t) = \sum_{i=\#Tx} A e^{j\omega(t+\tau_i)} \quad [1]$$

In this relationship, S(t) is the signal that is transmitted, A is the amplitude of Tx, ω is the Tx signal frequency (chirp), $\tau_i$ is the Tx #i chirp start delay for the $i^{th}$ transmitter Tx.

When the transmitter signal S(t) is an LFM signal, the time delay is equal to a constant frequency shift, which can be expressed as follows:

$$S(\omega) = \sum_{i=\#Tx} A e^{j\omega_i t} \quad [2]$$

In this relationship, A is the amplitude of transmitter signal Tx, and $\omega_i$ is the signal frequency (chirp) of Tx #i.

At the receiver end, the multiple transmitter signals cause the target to be received multiple times at each of the receivers 43a, 43b, 43c, . . . 43m, at different ranges, with the range being equivalent to frequency in the LFM signals. The receiving relationship can be expressed by the following relationship:

$$R = \frac{\tau c}{2} = \frac{f}{s} \cdot \frac{c}{2} \quad [3]$$

In this relationship, R is the Range [m], c is the speed of light [m/s], T is the time delay [sec], f is the frequency [Hz] and S is the chirp slope [MHz/sec].

The transmitter signals are shifted in frequency by adding a time delay in the respective chirp start.

Thus, the baseband can achieve a separation in frequency, as expressed in EQS. 1 and 2, and this shift in frequency creates a separated, shifted response in the baseband. By matching each of the responses from one segment of the baseband to another, the responses can be fine-tuned, thus reducing noise and improving targeting.

The introduction of the time delays in the chirp starts of transmitters 33b, 33c, . . . 33n in relation to the chirp start of transmitter 33a may be advantageously incorporated to effect frequency shifts between the transmitters 33a, 33b, 33c, . . . 33n. such that the respective transmitted LFM-CW radar signals are rendered orthogonal. Likewise, at the receivers 43a, 43b, 43c, . . . 43m, the echo signal can be decoded employing a matched-filter that is disposed to identify intended received signals from the reflected radar signal to effect decoding with the respective intended received signals.

Antenna design parameters, including aperture, power density, available power, gain, noise and noise rejection, bandwidth, radiation pattern (directional) are specific to an application to achieve desired results.

Figure 2:
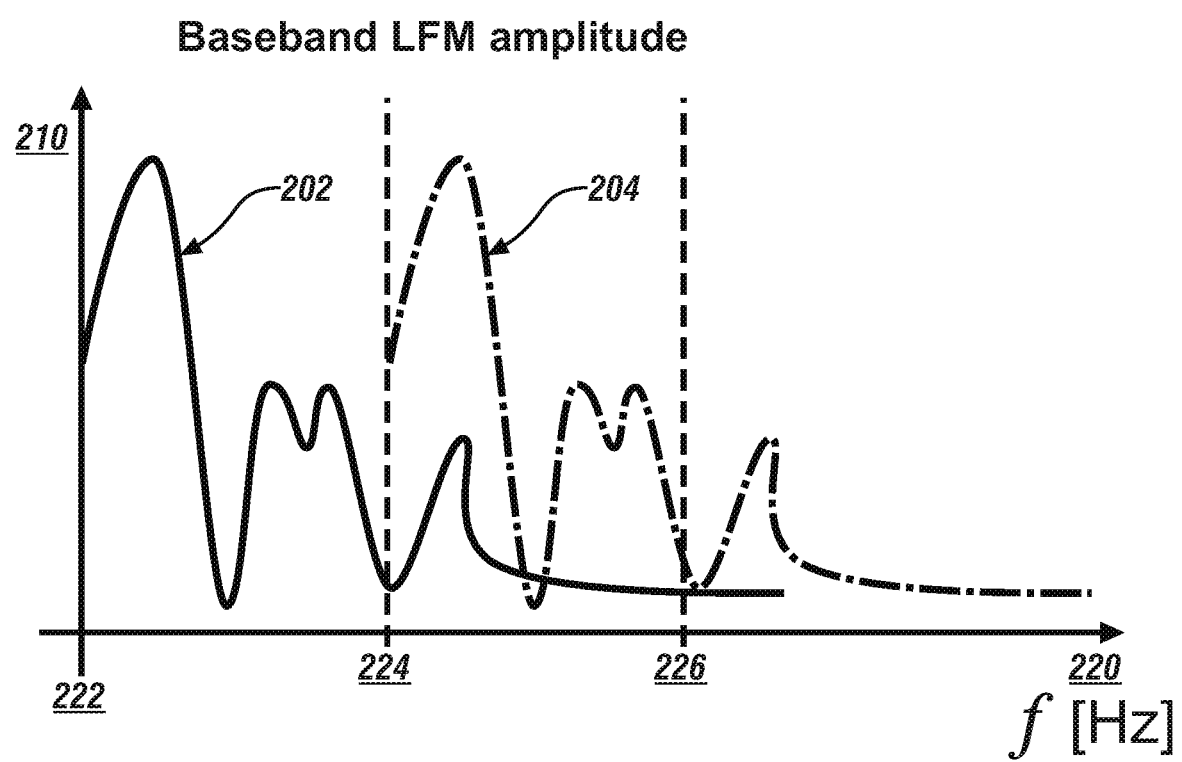
FIG. 2 graphically illustrates radar signals transmitted by a linear-frequency-modulated continuous-wave (LFM-CW) radar system, in accordance with the disclosure.

FIG. 2 graphically shows baseband LFM amplitudes in relation to frequency [Hz] for a first transmitter signal 202 and a second transmitter signal 204, wherein amplitude is indicated on the vertical axis 210 and frequency is indicated on the horizontal axis 220. Because frequency and time are equivalent in LFM-CW radar, the horizontal axis 220 also represents time. Thus, the first transmitter signal 202 is initiated with a chirp start at time/frequency 222 and terminates at time/frequency 226. The second transmitter signal 204 has a delay in the chirp start, and initiates at time/frequency 224, which is half way between 222 and 226. The delay in the chirp start of the second transmitter signal 204, as shown at 224, translates to a frequency shift, and the frequency shift generates a separated, shifted response in the baseband as compared to the first transmitter signal 202. Upon receiving an echo response in one of the receivers, matching the response from one segment of the baseband to another segment of the baseband can be implemented to clean the responses, reduce noise, and find the desired targets, i.e., identify objects in the path of the vehicle 10.

This configuration may achieve high angular resolution employing an antenna array that may be deployed on-vehicle such as a passenger car by having an embodiment of the MIMO radar system 20 that requires a relatively small aperture, and achieves a simultaneous transmitter signal orthogonality with the MIMO radar capabilities.

The teachings may be described herein in terms of functional and/or logical block components and/or various processing steps. It should be realized that such block components may be composed of hardware, software, and/or firmware components that have been configured to perform the specified functions.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A radar system for a vehicle, comprising:
    a multiple input-multiple output (MIMO) system including a plurality of transmitters, a plurality of receivers, and a controller including an interpreter in communication with the plurality of transmitters and the plurality of receivers;
    wherein the plurality of transmitters includes a first transmitter and a plurality of second transmitters;
    wherein each of the transmitters includes a signal generator in communication with a transmitting antenna that is disposed to transmit a radar signal;
    wherein each of the receivers includes a receiving antenna that is disposed to receive a reflected radar signal;
    wherein each of the transmitted radar signals is a linear-frequency-modulated continuous-wave (LFM-CW) radar signal including a chirp-start portion;
    wherein the transmitters are controllable such that the respective chirp-start portions of the LFM-CW radar signals that are transmitted from the second transmitters have progressively increased time delays as compared to the chirp-start portion of the LFM-CW radar signal that is transmitted from the first transmitter;
    wherein the respective chirp-start portions of the LFM-CW radar signals being transmitted from the transmitters have progressively increased time delays, including the first transmitter being arranged to generate a first transmitter signal and one of the plurality of second transmitters being arranged to generate a second transmitter signal;
    wherein the first transmitter signal is initiated with a first chirp start at a first time and is terminated at a second time; and
    wherein the second transmitter signal is initiated at a third time that is halfway between the first time and the second time.

2. The radar system of claim 1, wherein the plurality of transmitting antennae are disposed in a common location on the vehicle.

3. The radar system of claim 1, wherein the plurality of receiving antennae are disposed in a common location on the vehicle.

4. The radar system of claim 1, wherein each signal generator of the plurality of transmitters is configured to generate the respective LFM-CW radar signal independently from the other signal generators of the transmitters.

5. The radar system of claim 1, wherein the transmitting antennae are in close proximity to the receiving antennae on the vehicle.

6. The radar system of claim 1, wherein the signal generators comprise chirp digital direct synthesizer devices.

7. The radar system of claim 1, comprising the plurality of transmitters being controllable such that the respective chirp-start portions of the LFM-CW radar signals that are transmitted from the second transmitters have progressively increased frequencies as compared to the frequency of the LFM-CW radar signal that is transmitted from the first transmitter.

8. The radar system of claim 1, wherein the progressively increased time delays are selected to render the LFM-CW radar signals transmitted from each of the second transmitters orthogonal to the LFM-CW radar signal that is transmitted from the first transmitter.

9. The radar system of claim 1, wherein each of the receivers includes a receiving antenna that is disposed to receive a reflected radar signal, and wherein each of the receivers includes a matched-filter that is disposed to identify intended received signals from the reflected radar signal.

10. The radar system of claim 1, wherein the interpreter is disposed to effect image formation and analysis based upon the reflected radar signal.

11. A radar system for a ground vehicle, comprising:
    a multiple input-multiple output (MIMO) system including a plurality of transmitters each including a transmitting antenna, a plurality of receivers each including a receiving antenna, and a controller in communication with the plurality of transmitters and the plurality of receivers;
    wherein each transmitter includes a signal generator in communication with a transmitting antenna that is disposed to transmit a radar signal;
    wherein each receiver includes a receiving antenna that is disposed to receive a reflected radar signal, and wherein each of the receivers includes a matched-filter that is arranged to identify intended received signals from the reflected radar signal;
    wherein each radar signal is a linear-frequency-modulated continuous-wave (LFM-CW) radar signal including a chirp-start portion;
    wherein the plurality of transmitters includes a first transmitter and a second transmitter;
    wherein the respective chirp-start portions of the LFM-CW radar signals being transmitted from the transmitters have progressively increased time delays, including the first transmitter being arranged to generate a first transmitter signal and the second transmitter being arranged to generate a second transmitter signal;

wherein the first transmitter signal is initiated with a first chirp start at a first time and is terminated at a second time; and wherein the second transmitter signal is initiated at a third time that is halfway between the first time and the second time.

12. The radar system of claim 11, wherein the progressively increased time delays are selected to render the respective LFM-CW radar signal orthogonal to the other LFM-CW radar signals.

13. The radar system of claim 12, wherein each of the signal generators of the plurality of transmitters is configured to generate the respective LFM-CW radar signals independently from the other of the signal generators of the transmitters.

14. The radar system of claim 13, further comprising the plurality of transmitters being controllable such that the respective chirp-start portions of the LFM-CW radar signals have progressively increased frequencies;

wherein the first transmitter signal is initiated with the first chirp start at a first frequency and is terminated at a second frequency; and wherein the second transmitter signal is initiated at a third frequency that is halfway between the first frequency and the second frequency.

15. The radar system of claim 11, wherein the plurality of transmitting antennae are disposed in a common location on the vehicle.

16. The radar system of claim 11, wherein the plurality of receiving antennae are disposed in a common location on the vehicle.

17. The radar system of claim 11, wherein the transmitting antennae are in close proximity to the receiving antennae on the vehicle.

18. The radar system of claim 11, wherein the signal generators comprise chirp digital direct synthesizer devices.

* * * * *